United States Patent Office 2,938,058
Patented May 24, 1960

2,938,058

ARYLAMINOACENAPHTHENES AS ANTIOXIDANTS FOR POLYALKYLENE GLYCOL COMPOSITIONS

Samuel W. Tinsley, South Charleston, and John T. Fitzpatrick, Charleston, W. Va., assignors to Union Carbide Corporation, a corporation of New York No Drawing. Original application Feb. 10, 1956, Ser. No. 564,629. Divided and this application May 15, 1958, Ser. No. 735,385

2 Claims. (Cl. 260—611.5)

This invention relates to novel arylaminoacenaphthene compounds and uses thereof. This application is a divisional application of Serial No. 564,629, filed February 10, 1956, and now abandoned.

The preparation of arylaminonaphthalene derivatives by the reaction of an arylamine with a naphthol or naphthylamine is well known. Such reactions are carried out in the absence of a solvent, as for example in the synthesis of 1-anilinonaphthalene by the reaction of aniline with 1-naphthylamine at reflux in the presence of sulfanilic acid as catalyst, or they may be carried out in aqueous medium, as for example in the synthesis of 2-p-tolylamino-5-hydroxynaphthalene-7-sulfonic acid by the reaction of p-toluidine with 2-amino-5-hydroxynaphthalene-7-sulfonic acid in an aqueous sodium bisulfite solution at the reflux temperature of the reaction mixture. By these methods and modifications thereof many useful intermediates have been prepared.

It has now been found that 5-aminoacenaphthene will form 5-arylaminoacenaphthene compounds by reaction with an arylamine at an elevated temperature for a prolonged period of time. By the term arylamine is meant a primary monoamino aromatic compound.

The arylamines useful in this invention are aniline and its derivatives and naphthylamine and its derivatives. The substituents on the aniline and naphthylamine derivatives can be aryl such as a phenyl radical or alkyl having from 1 to about 3 carbon atoms, or alkoxy having from 1 to about 3 carbon atoms, or a hydroxy group.

Illustrative of the arylamines suitable in this invention are aniline, the toluidines, the anisidines, the xylidines, p-aminobiphenyl, beta-naphthylamine and the methyl naphthylamines.

The reaction can be carried out by heating a mixture of 5-aminoacenaphthene with the selected arylamine at about the reflux temperature of the reaction mixture until a practical conversion to 5-arylaminoacenaphthene has taken place. The reaction temperature will vary depending on the boiling point of the starting reaction mixture, but it should not be so high that decomposition of the starting materials will occur. Therefore, a temperature below about 320° C. is preferred.

Theoretically one mole of the arylamine derivative will react with one mole of 5-aminoacenaphthene. However, in order to obtain practical yields, and also to serve as a diluent, it is preferred to use more than a stoichiometric amount of arylamine. Therefore, a molar ratio of arylamine to 5-aminoacenaphthene of at least about 1.25:1 is recommended. Less than stoichiometric amounts are not recommended as it only tends to limit the yield, while excessively large amounts are wasteful and complicate separation of the desired arylaminoacenaphthene.

In order to hasten the reaction a catalyst is added at a concentration of about 1% by weight based on the total weight of the reaction mixture. Among the catalysts suitable in this reaction are sulfanilic acid, sulfuric acid and toluene sulfonic acid.

The 5-arylaminoacenaphthene compounds of this invention can be represented by the general formula

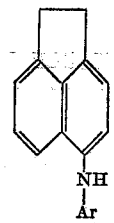

wherein Ar is an aryl radical such as

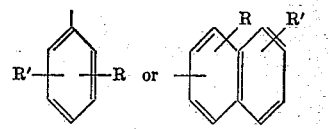

and wherein R and R' can be hydrogen, or alkyl containing from 1 to about 3 carbon atoms, or alkoxy having from 1 to about 3 carbon atoms, or hydroxyl, or phenyl radicals. Where R or R' is a phenyl radical it is located at any position except ortho to the position at which the Ar group is attached to the nitrogen atom.

In an embodiment of this invention 1 mole of 5-aminoacenaphthene is reacted with 1.5 mole of aniline and a catalytic amount of sulfanilic acid at the reflux temperature of the reaction mixture, about 200 to 220° C., for about 7.5 hours. At the end of this period the mixture is fractionally distilled under vacuum and the 5-anilinoacenaphthene recovered in the distillation is further purified by recrystallization from boiling ethanol.

The compound 5-anilinoacenaphthene is an excellent antioxidant for polyalkylene glycol lubricants and lubricants consisting of the mono- or di-ethers of the polyalkylene glycols.

These lubricants are of great industrial importance because of their desirable physical and chemical properties and stability over a wide temperature range. They have been successfully employed as lubricants in compressors, power recovery engines and vacuum pumps handling air, hydrogen, nitrogen, and hydrocarbons, as well as in equipment used for fabricating products from red-hot metal ingots and in the glass and ceramic industries where moving parts are subjected to high temperatures. Among other important uses are use as gear lubricants, hydraulic fluids, metal-working fluids to keep parts cool while machining, heat transfer fluids, leather and paper-treating compounds, rubber lubricants, textile fiber lubricants, cosmetic components and as plasticizers and solvents.

The lubricants can be prepared by well known procedures to yield products ranging in average molecular weight from about 250 up to above about 6000 as clear colorless liquids. In U.S. Patent 2,425,755 is disclosed a method of preparing the monoethers of the polyalkylene glycols having average molecular weights up to about 3000 by reacting a mixture of ethylene oxide, propylene oxide and a monohydric alcohol. U.S. Patent 2,425,845 demonstrates the preparation of polyalkylene glycols having average molecular weights up to and above about 6000 by reacting a mixture of ethylene oxide, propylene oxide and a dihydroxy alcohol. The monoethers of polypropylene glycol having average molecular weights up to about 2000 are prepared by the reaction of a monohydric alcohol with 1,2-propylene oxide as described in U.S. Patent 2,448,664. In U.S. Patents 2,520,611 and 2,520,612 are described methods for preparing diethers of polyalkylene glycols having average molecular weights up to about 2000 by reacting diethyl sulfate with a monoether of a polyalkylene glycol.

Small quantities of 5-anilinoacenaphthene in said lubricants have an appreciable stabilizing effect as indicated by the Bulk Oxidation Test. Consequently, little change in acid number of kinematic viscosity is observed when about 0.5% by weight of 5-anilinoacenaphthene is added to the lubricant, preferably from about 0.4 to about 2% by weight. Lesser quantities are not very effective as will be seen in Table I. For comparison purposes an example using 1-anilinonaphthalene, a conventional anti-oxidant, is included in the table.

TABLE I

| Antioxidant, percent by wt. added to lubricant* | 0.5% A | 0.1% B | 0.25% B | 0.5% B |
|---|---|---|---|---|
| Condensate after 10 hrs. of oxidation, ml. | 11.7 | 20 ml. in 7.1 hrs. | 18.7 | a few drops. |
| Kenematic viscosity, Cs.: | | | | |
| (a) at 100° F.— | | | | |
| at start | 63.33 | 62.22 | 62.54 | 63.51. |
| after 10 hrs. oxid | 60.14 | 60.87 | 63.78 | 64.84. |
| percent change | −5.04 | −2.18 | 1.98 | 2.06. |
| (b) at 210° F.— | | | | |
| at start | 10.96 | 10.96 | 10.97 | 10.99. |
| after 10 hrs. oxid | 9.63 | 9.42 | 9.74 | 11.33. |
| percent change | −12.1 | −14.1 | −11.3 | 3.1. |
| Acid number, mg. KOH/g. sple.: | | | | |
| at start | 0.198 | 0.148 | 0.172 | 0.149. |
| after 10 hrs. oxid | 18.6 | 21.2 | 22.7 | 1.43. |

A. 1-anilinonaphthalene.
B. 5-anilinoacenaphthene.
*Monobutyl ether of polypropylene glycol—Saybolt viscosity at 100° F. of 285.

It can readily be seen that at a concentration of 0.5% by weight of 5-anilinoacenaphthene in the lubricant that deterioration has been appreciably inhibited with the result that there is only a slight change in viscosity and acid number after oxidation.

The Bulk Oxidation Test used to determine the antioxidative ability of an additive is performed by heating a mixture of 100±1 grams of the lubricant mixture to be tested with 50±1 mgms. of copper metal powder and 50±1 mgms. of iron powder at 171±2° C. Air is then blown into the mixture at a rate of 0.03 cubic feet per minute for a period of ten hours. During this time the amount of heat supplied is kept constant, and the temperature is allowed to rise as oxidation of the oil begins. Any distillate carried over is collected in a graduated receiving funnel and at the end of the test period is measured. The kinematic viscosities at two temperatures and the acid number are determined on the remaining oil.

The kinematic viscosity was determined using a Saybolt Viscosimeter.

The following examples further serve to illustrate the invention.

Example 1

A three-necked Pyrex flask equipped with a stirrer, therometer and reflux condenser was charged with 85 grams of 5-aminoacenaphthene, 70 grams of aniline and 1.5 grams of sulfanilic acid. The temperature of the reaction mixture was raised to about 200° C., at which point reflux started, and the reaction was refluxed for 7½ hours. At the end of this period the reflux temperature was 220° C. The reaction mixture was vacuum distilled and there was recovered 36 grams of unreacted aniline at 79 to 83° C. at a pressure of 20 mm. of mercury. Then at 188 to 192° C. at a pressure of 1 mm. of mercury there was recovered 80 grams of 5-anilinoacenaphthene. This was dissolved in boiling ethanol, slowly cooled to room temperature to crystallize and a crop of colorless crystals of 5-anilinoacenaphthene which had a melting point of 129 to 130.5° C. was filtered off.

Example 2

The procedure of Example 1 was repeated using 85 grams of 5-aminoacenaphthene, 80 grams of p-toluidine and 1.5 grams of sulfanilic acid. Over a 6 hour reflux period the reaction temperature went from 215° C. up to 235° C. At the end of this period there was recovered 43 grams of unreacted p-toluidine at 95 to 90° C. at a pressure of 20 to 2.5 mm. of mercury and 10 grams of unreacted 5-aminoacenaphthene at 90 to 210° C. at a pressure of 2.5 mm. of mercury. Then at 217 to 235° C. at a pressure of 3 mm. of mercury there was obtained 86 grams of 5-(4-methylanilino)-acenaphthene. This was recrystallized from boiling ethanol to yield 64 grams of almost colorless crystals of 5-(4-methylanilino)-acenaphthene having a melting point of 117 to 118° C.

Example 3

A mixture of the monobutyl ether of polypropylene glycol, having a Saybolt viscosity at 100° F. to 285, and 5-anilinoacenaphthene was prepared by a simple mixing operation. The concentration of the 5-anilinoacenaphthene was 0.5% by weight. This composition was then tested for resistance to oxidation by the Bulk Oxidation Test hereinbefore described. The kinematic viscosity and acid number were determined before and after the oxidation period. For comparison purposes a similar composition was prepared using 0.5% by weight of 1-anilinonaphthalene, a conventional antioxidant. Results were tabulated supra in Table I.

We claim:

1. A composition of matter comprising a polyalkylene glycol having an average molecular weight of at least about 250 in admixture with from about 0.1 to about 2% by weight of 5-anilinoacenaphthene.

2. A composition of matter comprising a lower alkyl ether of a polyalkylene glycol having an average molecular weight of at least about 250 in admixture with from about 0.1 to about 2% by weight of 5-anilinoacenaphthene.

References Cited in the file of this patent

UNITED STATES PATENTS

| 1,809,799 | Clifford | June 9, 1931 |
| 2,481,278 | Ballard et al. | Sept. 6, 1949 |
| 2,520,733 | Morris et al. | Aug. 29, 1950 |
| 2,641,614 | Britton et al. | June 9, 1953 |